United States Patent
Damnjanovic et al.

(10) Patent No.: US 10,206,117 B2
(45) Date of Patent: Feb. 12, 2019

(54) RADIO SHARED SPECTRUM ACCESS PROCEDURES

(71) Applicant: QUALCOMM Incorporated, San Diego, CA (US)

(72) Inventors: Aleksandar Damnjanovic, Del Mar, CA (US); Siddhartha Mallik, San Diego, CA (US); Juan Montojo, San Diego, CA (US); Xiaoxia Zhang, San Diego, CA (US); Taesang Yoo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/654,299

(22) Filed: Jul. 19, 2017

(65) Prior Publication Data

US 2018/0115906 A1  Apr. 26, 2018

Related U.S. Application Data

(60) Provisional application No. 62/413,201, filed on Oct. 26, 2016.

(51) Int. Cl.
| | |
|---|---|
| *H04W 16/14* | (2009.01) |
| *H04W 72/12* | (2009.01) |
| *H04B 17/309* | (2015.01) |
| *H04W 72/08* | (2009.01) |
| *H04W 74/08* | (2009.01) |
| *H04W 56/00* | (2009.01) |

(52) U.S. Cl.
CPC ....... *H04W 16/14* (2013.01); *H04W 72/1215* (2013.01); *H04W 74/0866* (2013.01); *H04B 17/309* (2015.01); *H04W 56/001* (2013.01); *H04W 72/082* (2013.01); *H04W 74/0816* (2013.01); *H04W 74/0825* (2013.01)

(58) Field of Classification Search
CPC ............................. H04W 56/001; H04W 16/14
USPC ................................................... 370/315, 320
See application file for complete search history.

(56) References Cited

U.S. PATENT DOCUMENTS

| | | | | |
|---|---|---|---|---|
| 5,991,345 | A * | 11/1999 | Ramasastry | H04B 7/18534 370/320 |
| 2013/0176934 | A1* | 7/2013 | Malladi | H04W 56/001 370/315 |
| 2015/0023315 | A1 | 1/2015 | Yerramalli et al. | |

(Continued)

FOREIGN PATENT DOCUMENTS

| | | |
|---|---|---|
| WO | WO-2015051828 A1 | 4/2015 |
| WO | 2015077747 A2 | 5/2015 |

OTHER PUBLICATIONS

International Search Report and Written Opinion—PCT/US2017/055391—ISA/EPO—dated Jan. 16, 2018.

*Primary Examiner* — William D Cumming
(74) *Attorney, Agent, or Firm* — Patterson & Sheridan, L.L.P

(57) ABSTRACT

Certain aspects of the present disclosure provide techniques for accessing shared spectrum in new radio (NR). An apparatus of a first operator may determine a synchronization configuration for the first operator and at least a second operator that share spectrum, identify, based on the synchronization configuration, at least a first channel reserved for contending for access to the spectrum, and reserve the access to the spectrum in the first channel to access at least a second channel for communications.

14 Claims, 15 Drawing Sheets

(56) References Cited

U.S. PATENT DOCUMENTS

| | | |
|---|---|---|
| 2015/0092758 A1 | 4/2015 | Chen et al. |
| 2015/0289293 A1 | 10/2015 | Zhang et al. |
| 2016/0105858 A1 | 4/2016 | Damnjanovic et al. |
| 2016/0142994 A1 | 5/2016 | Luo et al. |
| 2016/0192201 A1 | 6/2016 | Wang |
| 2016/0277937 A1* | 9/2016 | Yilmaz ................. H04W 16/14 |
| 2016/0366689 A1* | 12/2016 | Zhang ................... H04L 5/0091 |
| 2017/0013471 A1 | 1/2017 | Wu et al. |
| 2018/0115906 A1* | 4/2018 | Damnjanovic ....... H04W 16/14 |

* cited by examiner

RADIO SHARED SPECTRUM ACCESS PROCEDURES

This application claims the benefit of U.S. Provisional Patent Application Ser. No. 62/413,201, filed Oct. 26, 2016, which is assigned to the assignee hereof and hereby expressly incorporated by reference herein.

BACKGROUND

I. Field of the Disclosure

Aspects of the present disclosure relate to wireless communications systems and, more particularly, to procedures for protecting access shared spectrum (SS) in new radio (NR).

II. Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

A wireless communication network may include a number of Node Bs that can support communication for a number of user equipments (UEs). A UE may communicate with a Node B via the downlink and uplink. The downlink (or forward link) refers to the communication link from the Node B to the UE, and the uplink (or reverse link) refers to the communication link from the UE to the Node B.

These multiple access technologies have been adopted in various telecommunication standards to provide a common protocol that enables different wireless devices to communicate on a municipal, national, regional, and even global level. An example of an emerging telecommunication standard is new radio (NR, e.g., 5G radio access (RA)). NR is a set of enhancements to the LTE mobile standard promulgated by Third Generation Partnership Project (3GPP). It is designed to better support mobile broadband Internet access by improving spectral efficiency, lower costs, improve services, make use of new spectrum, and better integrate with other open standards using OFDMA with a cyclic prefix (CP) on the downlink (DL) and on the uplink (UL) as well as support beamforming, multiple-input multiple-output (MIMO) antenna technology, and carrier aggregation. However, as the demand for mobile broadband access continues to increase, there exists a need for further improvements in NR technology. Preferably, these improvements should be applicable to other multi-access technologies and the telecommunication standards that employ these technologies.

As the demand for mobile broadband access continues to increase, using shared radio frequency spectrum (SRFS), which may include unlicensed radio frequency spectrum (URFS), has been considered to help solve the spectrum congestion problem for future wireless needs, not only to meet the growing demand for mobile broadband access, but also to advance and enhance the user experience with mobile communications. However, the SRFS may carry other transmissions, and therefore techniques such as listen before talk (LBT) and clear channel assessment (CCA) may be used in an effort prevent excessive interference. In certain scenarios, wireless devices operating in a shared spectrum may be asynchronous. It may be desirable to mitigate interference caused by wireless devices operating in the scared spectrum.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for accessing shared spectrum in NR based on a synchronization configuration for one or more operators are described herein.

Certain aspects of the present disclosure provide a method for wireless communication. The method may be performed, for example, by a BS of a first operator. The method generally includes determining a synchronization configuration for the first operator and at least a second operator that share spectrum. The method also includes identifying, based on the synchronization configuration, at least a first channel dedicated for reserving access to the spectrum. The method further includes reserving the access to the spectrum in the first channel to at least access a second channel for communications.

Certain aspects of the present disclosure provide an apparatus of a first operator for wireless communication. The apparatus includes at least one processor and a memory coupled to the at least one processor. The at least one processor is configured to determine a synchronization configuration for the first operator and at least a second operation that share spectrum. The at least one processor is configured to identify, based on the synchronization configuration, at least a first channel dedicated for reserving access to the spectrum. The at least one processor is further configured to reserve access to the spectrum in the first channel to at least access a second channel for communications.

Certain aspects of the present disclosure provide an apparatus of a first operator for wireless communication. The apparatus includes means for determining a synchronization configuration for the first operator and at least a second operator that share spectrum. The apparatus also includes means for identifying, based on the synchronization configuration, at least a first channel dedicated for reserving access to the spectrum. The apparatus further includes means for reserving the access to the spectrum in the first channel to at least access a second channel for communications.

Certain aspects of the present disclosure provide a computer-readable medium having computer executable code stored thereon. The computer executable code generally includes code for determining, by an apparatus of a first operator, a synchronization configuration for the first operator and at least a second operator that share spectrum. The computer executable code also includes code for identifying, by the first operator, based on the synchronization configuration, at least a first channel dedicated for reserving access to the spectrum. The computer executable code further includes code for reserving, by the first operator, the access to the spectrum in the first channel to at least access a second channel for communications.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
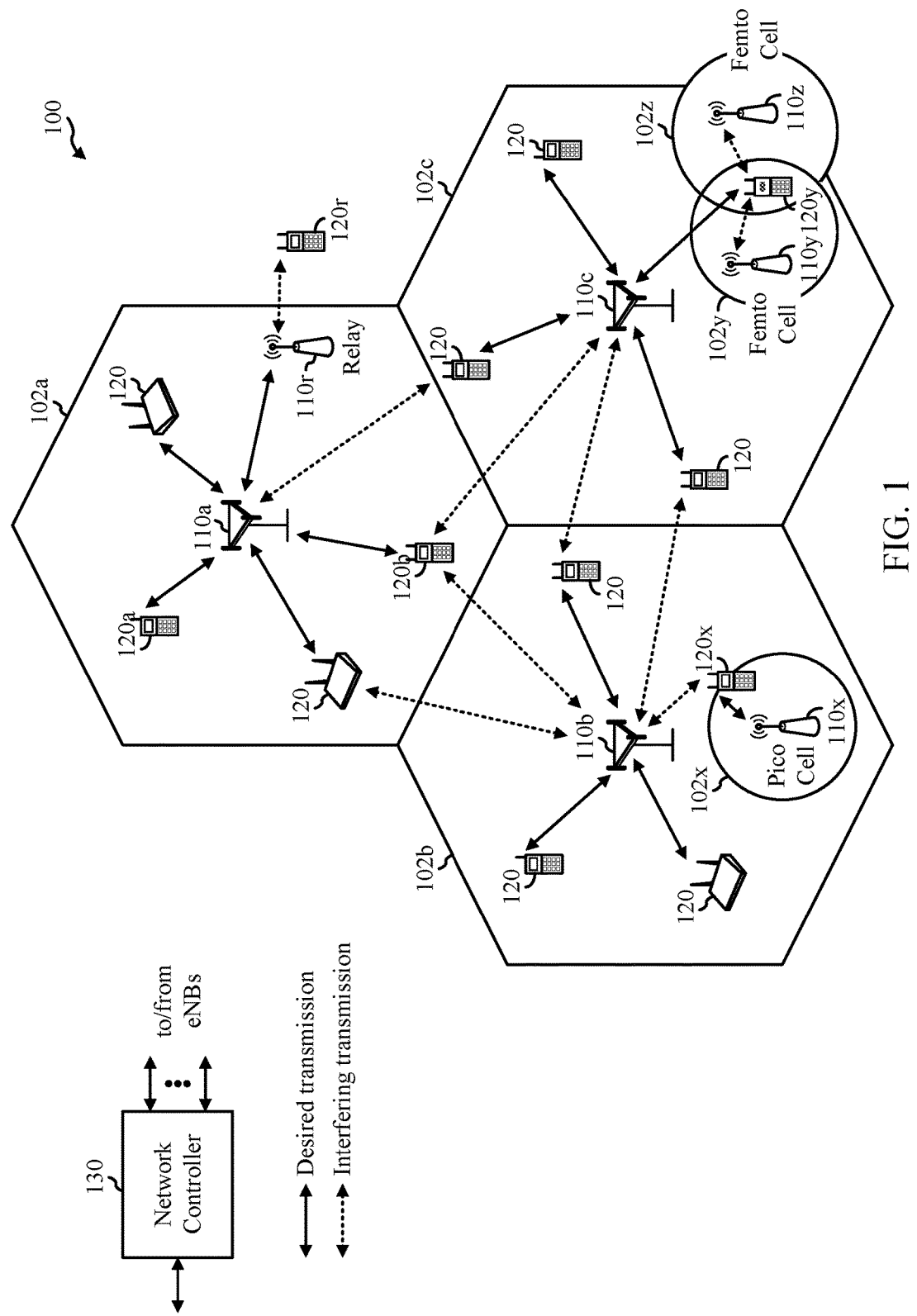
FIG. 1 is a block diagram conceptually illustrating an example telecommunications system, according to aspects of the present disclosure.

Aspects of the present disclosure provide apparatus, methods, processing systems, and computer readable mediums for procedures for accessing shared spectrum in NR. As described herein, according to aspects of the present disclosure, transmitters may not be discoverable or detected by each other. For example, a transmitter of a first operator may not be synchronized with respect to another transmitter of the first operator and/or or one or more transmitters of at least a second operator. In an effort to mitigate contention to shared spectrum, aspects presented herein provide contention access procedures that are based on a synchronization configuration of one or more operators.

For example, as described in more detail below, there may one or more different synchronization configurations for operators in NR. In one example, a first operator may be fully synchronized with a second operator. That is, synchronization may exist between operators and within each operator. In one example, a first operator may be partially synchronized with respect to a second operator. That is, synchronization may exist within each operator and may not exist between operators. In one example, there may no synchronization either within an operator or between operators (e.g., an asynchronous configuration).

According to aspects, transmitters may determine how to access the shared spectrum based on the synchronization configuration. For example, transmitters may determine resources (e.g., time/frequency resources) of a reservation channel dedicated for reserving access to the spectrum shared by different operators. The transmitters may contend for access to the shared spectrum (e.g., using the determined resources) in order to reserve (e.g., access) at least a second channel for communications (e.g., a data channel).

For illustrative purposes, aspects are described with reference to a BS serving at a transmitter and a UE serving as a receiver. However, aspects of the present disclosure are not so limited. For example, a UE associated with a first operator may act as a BS to contend for access to spectrum shared by the first operator and at least a second operator based on a synchronization configuration for the first and second operators (e.g., in NR).

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting and the scope of the disclosure is being defined by the appended claims and equivalents thereof.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

For clarity, while aspects may be described herein using terminology commonly associated with 3G and/or 4G wireless technologies, aspects of the present disclosure can be applied in other generation-based communication systems, such as 5G and later, including NR technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may include Enhanced mobile broadband (eMBB) targeting wide bandwidth (e.g., 80 MHz beyond), millimeter wave (mmW) targeting high carrier frequency (e.g., 60 GHz), massive MTC (mMTC) targeting non-backward compatible MTC techniques, and mission critical targeting ultra reliable low latency communications (URLLC). For these general topics, different techniques are considered, such as coding, low-density parity check (LDPC), and polar. NR cell may refer to a cell operating according to the new air interface or fixed transport layer. A NR Node B (e.g., 5G Node B) may correspond to one or multiple transmission reception points (TRPs).

NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. TRPs may transmit downlink signals to UEs indicating the cell type. Based on the cell type indication, the UE may communicate with the TRP. For example, the UE may determine TRPs to consider for cell selection, access, handover, and/or measurement based on the indicated cell type.

In some cases, the UE can receive measurement configuration from the RAN. The measurement configuration information may indicate ACells or DCells for the UE to measure. The UE may monitor/detect measurement reference signals from the cells based on measurement configuration information. In some cases, the UE may blindly detect MRS. In some cases the UE may detect MRS based on MRS-IDs indicated from the RAN. The UE may report the measurement results.

Example Wireless Communications System

FIG. 1 illustrates an example wireless network 100 in which aspects of the present disclosure may be performed. For example, the wireless network may be new radio (NR) or 5G network. BSs 110 in the network may be configured in different synchronous modes and/or associated with different operators. For example, one or more BSs 110 may be fully synchronous with respect to one or more other BSs 110. In one example, one or more BSs 110 may be partially synchronous with respect to one or more other BSs 110. In one example, one or more BSs 110 may be asynchronous with respect to one or more other BSs 110.

The BSs 110 that are associated with one or more operators may determine how to access the spectrum shared by the operators based on the synchronous configuration (e.g., whether synchronization exists within the operator associated with the particular BS 110 and/or between the operator associated with the particular BS 110 and another operator). For example, the BSs 110 can identify resources of at least a first channel dedicated for reserving access to the shared spectrum. Once identified, the BSs 110 may reserve the access to the shared spectrum in the first channel to at least access a second channel for communications.

The BS 110 (and/or UE 120 acting as a BS) may be configured to perform the operations 900 and/or other aspects described for accessing shared spectrum in NR, which are described in more detail herein.

The system illustrated in FIG. 1 may be, for example, a long term evolution (LTE) network. The wireless network 100 may include a number of Node Bs (e.g., eNodeBs, eNBs, 5G Node B, etc) 110 and other network entities. A Node B may be a station that communicates with the UEs and may also be referred to as a base station, an access point, or a 5G Node B.

Each Node B 110 may provide communication coverage for a particular geographic area. In 3GPP, the term "cell" can refer to a coverage area of a Node B and/or a Node B subsystem serving this coverage area, depending on the context in which the term is used.

A Node B may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.).

A Node B for a macro cell may be referred to as a macro Node B. A Node B for a pico cell may be referred to as a pico Node B. A Node B for a femto cell may be referred to as a femto Node B or a home Node B. In the example shown in FIG. 1, the Node Bs 110a, 110b and 110c may be macro Node Bs for the macro cells 102a, 102b and 102c, respectively. The Node B 110x may be a pico Node B for a pico cell 102x. The Node Bs 110y and 110z may be femto Node Bs for the femto cells 102y and 102z, respectively. A Node B may support one or multiple (e.g., three) cells.

The wireless network 100 may also include relay stations. A relay station is a station that receives a transmission of data and/or other information from an upstream station (e.g., a Node B or a UE) and sends a transmission of the data and/or other information to a downstream station (e.g., a UE or a Node B). A relay station may also be a UE that relays transmissions for other UEs. In the example shown in FIG. 1, a relay station 110r may communicate with the Node B 110a and a UE 120r in order to facilitate communication between the Node B 110a and the UE 120r. A relay station may also be referred to as a relay Node B, a relay, etc.

The wireless network 100 may be a heterogeneous network that includes Node Bs of different types, e.g., macro Node Bs, pico Node Bs, femto Node Bs, relays, transmission reception points (TRPs), etc. These different types of Node Bs may have different transmit power levels, different coverage areas, and different impact on interference in the wireless network 100. For example, macro Node Bs may have a high transmit power level (e.g., 20 Watts) whereas pico Node Bs, femto Node Bs and relays may have a lower transmit power level (e.g., 1 Watt).

The wireless network 100 may support synchronous or asynchronous operation. For synchronous operation, the Node Bs may have similar frame timing, and transmissions from different Node Bs may be approximately aligned in time. For asynchronous operation, the Node Bs may have different frame timing, and transmissions from different Node Bs may not be aligned in time. The techniques described herein may be used for both synchronous and asynchronous operation.

A network controller 130 may couple to a set of Node Bs and provide coordination and control for these Node Bs. The network controller 130 may communicate with the Node Bs 110 via a backhaul. The Node Bs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A UE may be able to communicate with macro Node Bs, pico Node Bs, femto Node Bs, relays, etc. In FIG. 1, a solid line with double arrows indicates desired transmissions between a UE and a serving Node B, which is a Node B designated to serve the UE on the downlink and/or uplink. A dashed line with double arrows indicates interfering transmissions between a UE and a Node B.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively. New radio (NR) may use a different air interface, other than OFDM-based. NR networks may include entities such central units or distributed units.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. A single component carrier bandwidth of 100 MHZ may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. UL and DL subframes for NR may be described in more detail below with respect to FIGS. 7 and 8. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units or distributed units.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
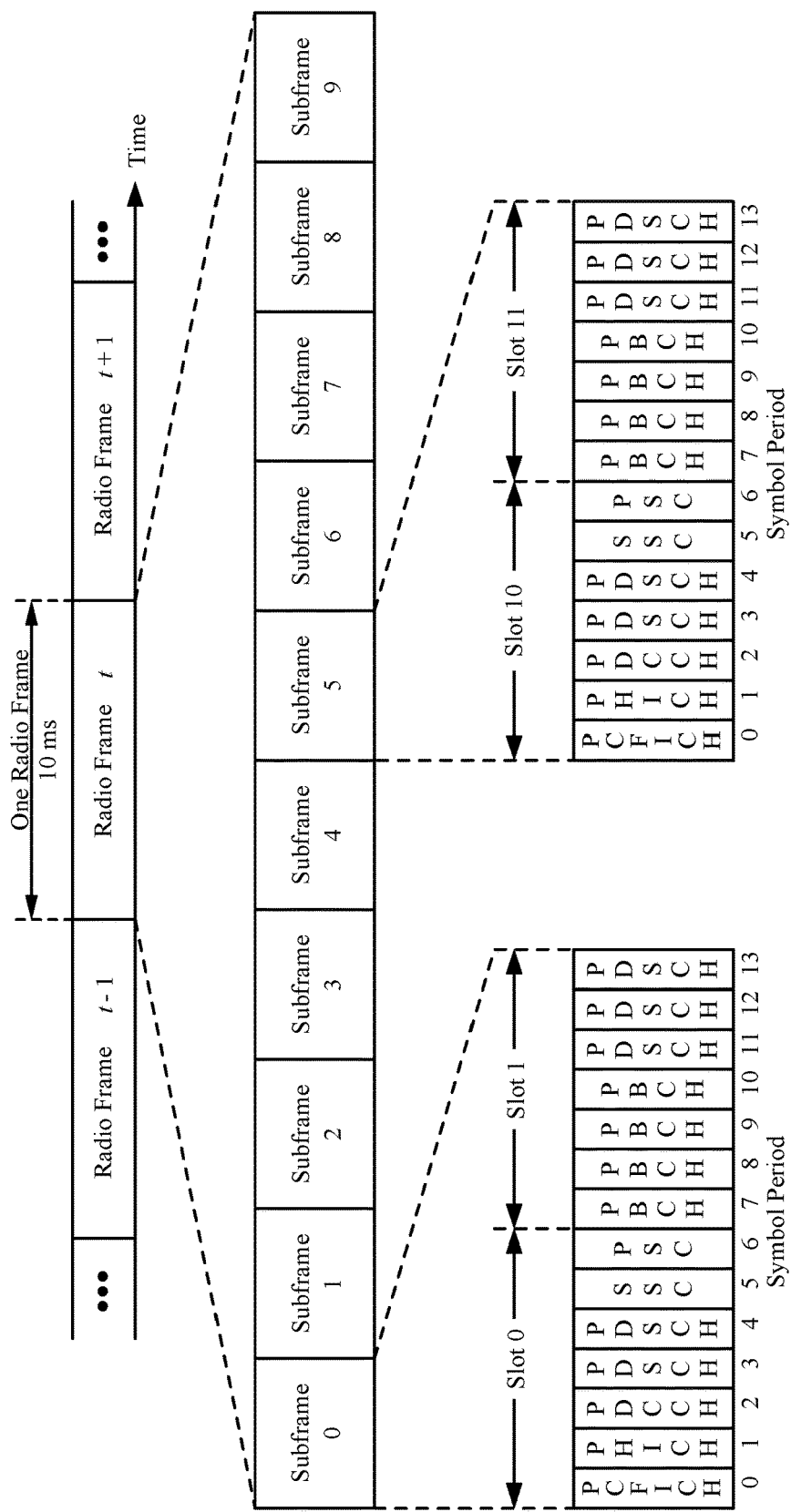
FIG. 2 is a block diagram conceptually illustrating an example downlink frame structure in a telecommunications system, according to aspects of the present disclosure.

FIG. 2 shows a down link (DL) frame structure used in a telecommunication systems (e.g., LTE). The transmission timeline for the downlink may be partitioned into units of radio frames. Each radio frame may have a predetermined duration (e.g., 10 milliseconds (ms)) and may be partitioned into 10 sub-frames with indices of 0 through 9. Each sub-frame may include two slots. Each radio frame may thus include 20 slots with indices of 0 through 19. Each slot may include L symbol periods, e.g., 7 symbol periods for a normal cyclic prefix (as shown in FIG. 2) or 14 symbol periods for an extended cyclic prefix. The 2L symbol periods in each sub-frame may be assigned indices of 0 through 2L−1. The available time frequency resources may be partitioned into resource blocks. Each resource block may cover N subcarriers (e.g., 12 subcarriers) in one slot.

In LTE, a Node B may send a primary synchronization signal (PSS) and a secondary synchronization signal (SSS) for each cell in the Node B. The primary and secondary synchronization signals may be sent in symbol periods 6 and 5, respectively, in each of sub-frames 0 and 5 of each radio frame with the normal cyclic prefix, as shown in FIG. 2. The synchronization signals may be used by UEs for cell detection and acquisition. The Node B may send a Physical Broadcast Channel (PBCH) in symbol periods 0 to 3 in slot 1 of sub-frame 0. The PBCH may carry certain system information.

The Node B may send a Physical Control Format Indicator Channel (PCFICH) in only a portion of the first symbol period of each sub-frame, although depicted in the entire first symbol period in FIG. 2. The PCFICH may convey the number of symbol periods (M) used for control channels, where M may be equal to 1, 2 or 3 and may change from sub-frame to sub-frame. M may also be equal to 4 for a small system bandwidth, e.g., with less than 10 resource blocks. In the example shown in FIG. 2, M=3. The Node B may send a Physical HARQ Indicator Channel (PHICH) and a Physical Downlink Control Channel (PDCCH) in the first M symbol periods of each sub-frame (M=3 in FIG. 2). The PHICH may carry information to support hybrid automatic retransmission (HARQ). The PDCCH may carry information on uplink and downlink resource allocation for UEs and power control information for uplink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The Node B may send a Physical Downlink Shared Channel (PDSCH) in the remaining symbol periods of each sub-frame. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The Node B may send the PSS, SSS and PBCH in the center 1.08 MHz of the system bandwidth used by the Node B. The Node B may send the PCFICH and PHICH across the entire system bandwidth in each symbol period in which these channels are sent. The Node B may send the PDCCH to groups of UEs in certain portions of the system bandwidth. The Node B may send the PDSCH to specific UEs in specific portions of the system bandwidth. The Node B may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A Node B may send the PDCCH to the UE in any of the combinations that the UE will search.

A UE may be within the coverage of multiple Node Bs. One of these Node Bs may be selected to serve the UE. The serving Node B may be selected based on various criteria such as received power, path loss, signal-to-noise ratio (SNR), etc.

Figure 3:
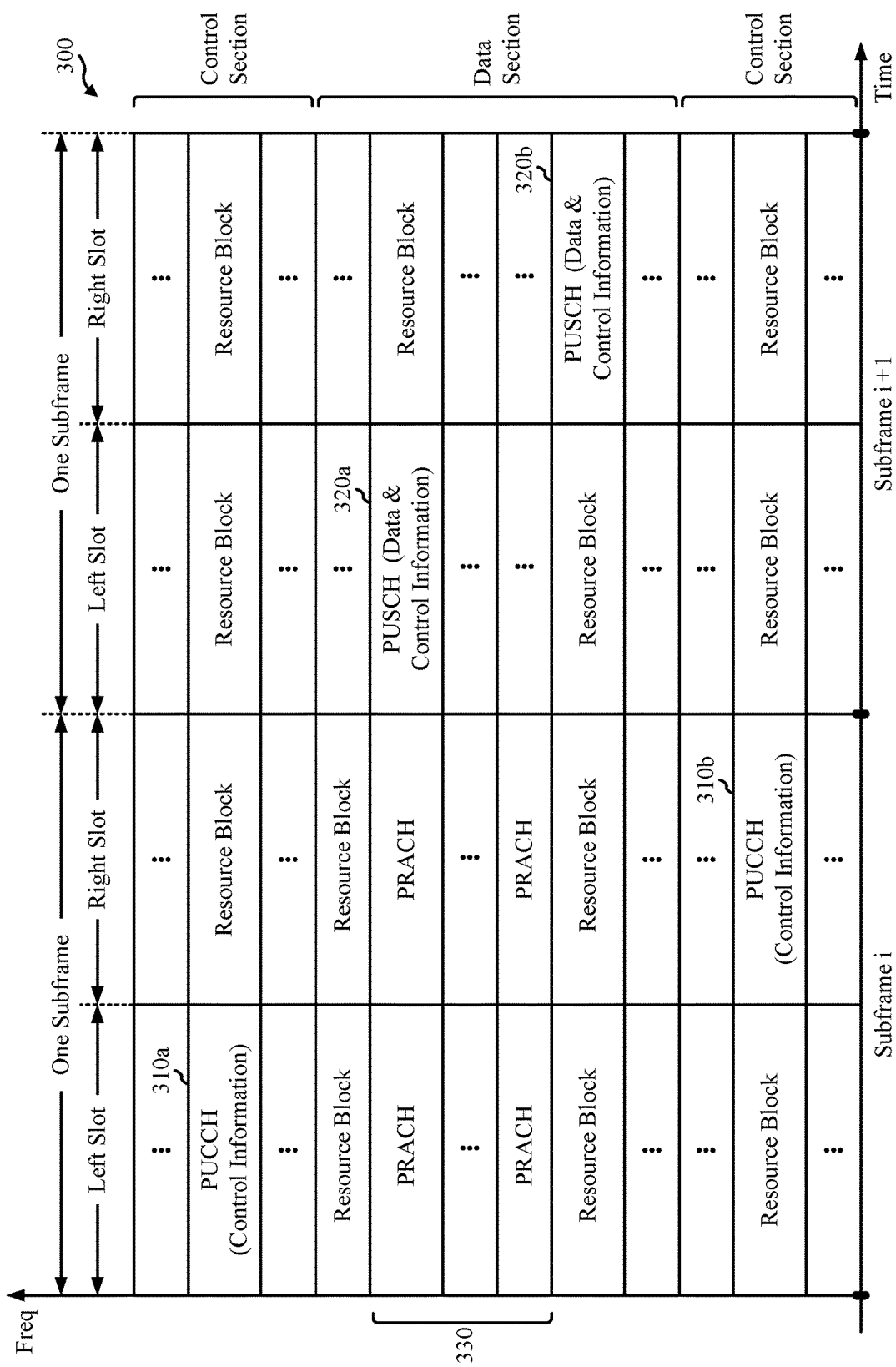
FIG. 3 is a diagram illustrating an example uplink frame structure in a telecommunications system, according to aspects of the present disclosure.

FIG. 3 is a diagram 300 illustrating an example of an uplink (UL) frame structure in a telecommunications system (e.g., LTE). The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 310*a*, 310*b* in the control section to transmit control information to a Node B. The UE may also be assigned resource blocks 320*a*, 320*b* in the data section to transmit data to the Node B. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 330. The PRACH 330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 4:
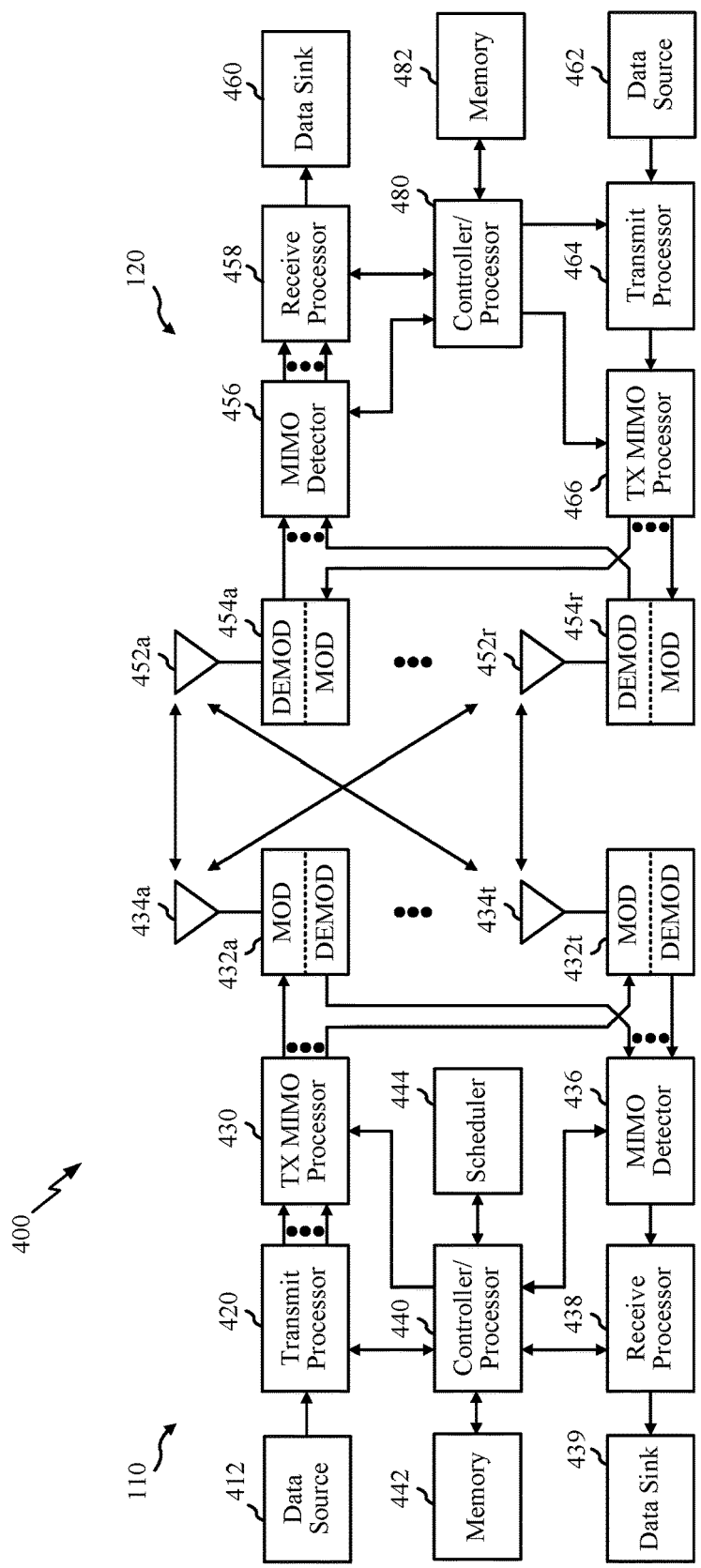
FIG. 4 is a block diagram conceptually illustrating a design of an example Node B and user equipment (UE), according to aspects of the present disclosure.

FIG. 4 illustrates example components of the base station 110 and UE 120 illustrated in FIG. 1, which may be used to implement aspects of the present disclosure. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations 900 described herein and illustrated with reference to FIGS. 9-16. The BS 110 may comprise a TRP.

FIG. 4 shows a block diagram of a design of a base station/Node B/TRP 110 and a UE 120, which may be one of the base stations/Node Bs/TRPs and one of the UEs in FIG. 1. For a restricted association scenario, the base station 110 may be the macro Node B 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the base station 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of various processes for the techniques described herein and those illustrated in the appended drawings. The processor 480 and/or other processors and modules at the UE 120 may also perform or direct, e.g., the execution of various processes for the techniques described herein and those illustrated in the appended drawings. A scheduler 444 may schedule UEs for data transmission on the downlink and/or uplink.

Example New Radio Cell Measurement

New radio (NR) may refer to radios configured to operate according a wireless standard, such as 5G (e.g. wireless network 100). NR may include Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and mission critical targeting ultra reliable low latency communications (URLLC).

NR cell may refer to a cell operating according in the NR network. A NR Node B (e.g., Node B 110) may correspond to one or multiple transmission reception points (TRPs). As used herein, a cell may refer to a combination of downlink (and potentially also uplink) resources. The linking between the carrier frequency of the downlink resources and the carrier frequency of the uplink resources is indicated in the system information (SI) transmitted on the downlink resources. For example, system information can be transmitted in a physical broadcast channel (PBCH) carrying a master information block (MIB).

NR RAN architecture may include a central unit (CU) (e.g., network controller 130) and distributed units (DUs). A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 5:
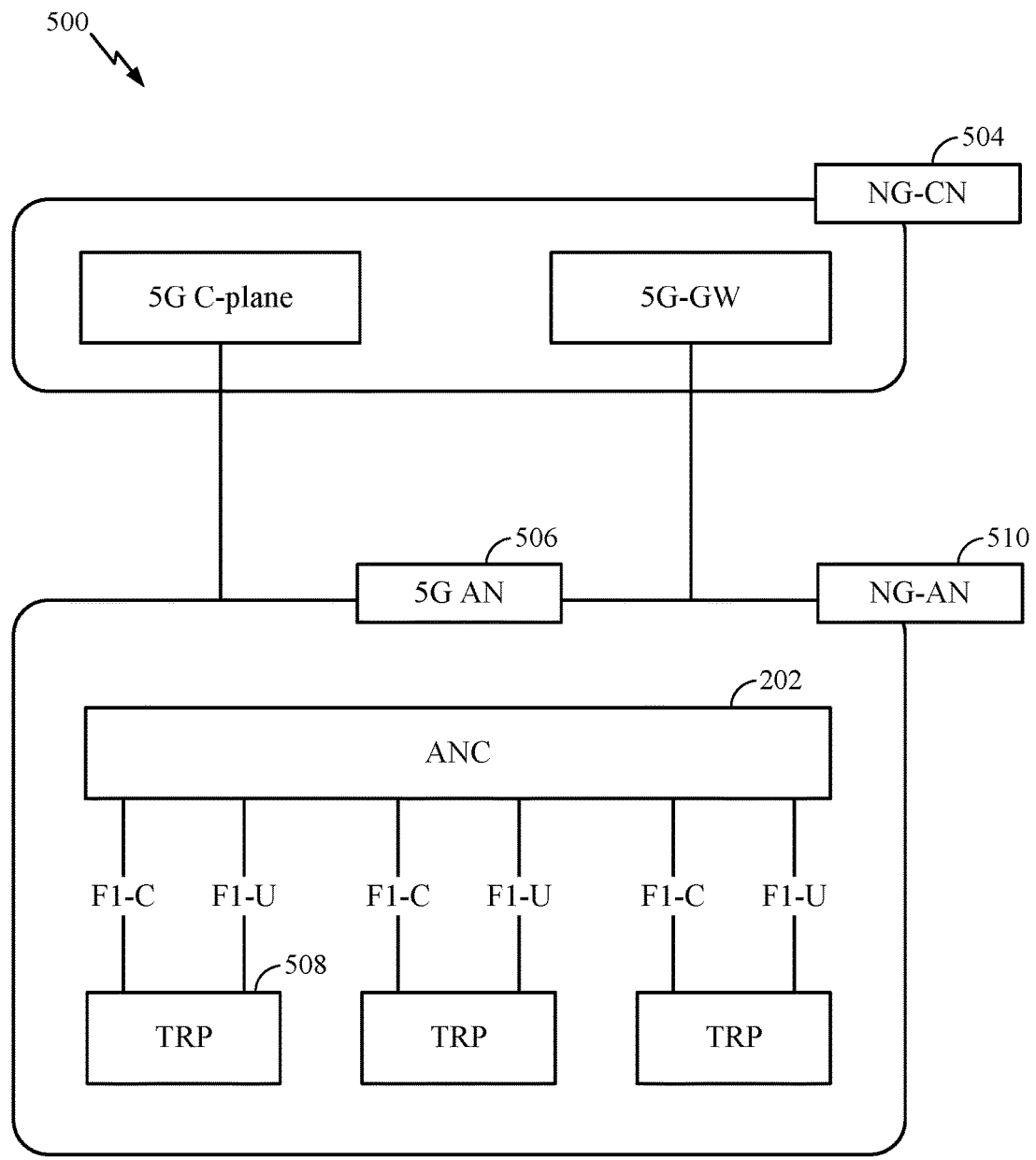
FIG. 5 illustrates an example logical architecture of a distributed radio access network (RAN), in accordance with certain aspects of the present disclosure.

FIG. 5 illustrates an example logical architecture of a distributed radio access network (RAN) 500, which may be implemented in the wireless communication system illustrated in FIG. 1. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNBs, or some other term). As described above, a TRP may be used interchangeably with "cell."

The TRPs 508 may be a DU. The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 500 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture 500. The Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 502) and/or one or more distributed units (e.g., one or more TRPs 508).

Figure 6:
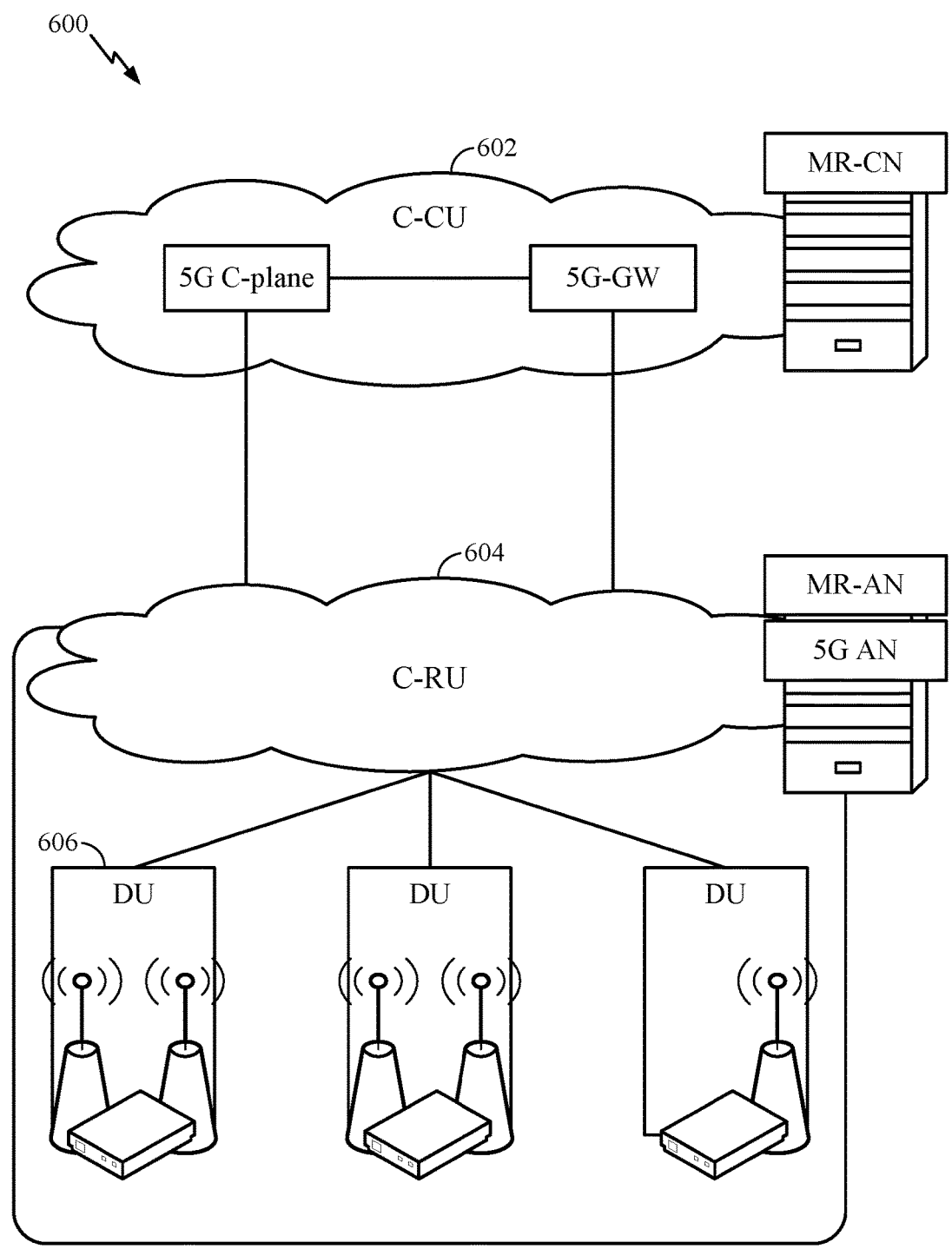
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A DU 606 may host one or more TRPs (edge node (EN), an edge unit (EU), a radio head (RH), a smart radio head (SRH), or the like). The DU may be located at edges of the network with radio frequency (RF) functionality.

Figure 7:
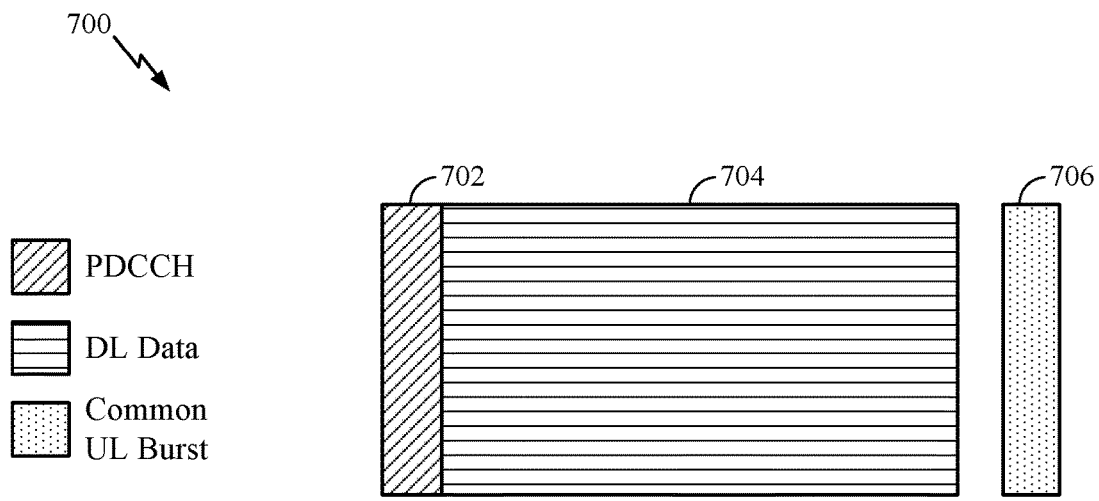
FIG. 7 is a diagram illustrating an example of a downlink (DL)-centric subframe, in accordance with certain aspects of the present disclosure.

FIG. 7 is a diagram 700 showing an example of a DL-centric subframe. The DL-centric subframe may include a control portion 702. The control portion 702 may exist in the initial or beginning portion of the DL-centric subframe. The control portion 702 may include various scheduling information and/or control information corresponding to various portions of the DL-centric subframe. In some configurations, the control portion 702 may be a physical DL control channel (PDCCH), as indicated in FIG. 7. The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include a common UL portion 706. The common UL portion 706 may sometimes be referred to as an UL burst, a common UL burst, and/or various other suitable terms. The common UL portion 706 may include feedback information corresponding to various other portions of the DL-centric subframe. For example, the common UL portion 706 may include feedback information corresponding to the control portion 702. Non-limiting examples of feedback information may include an ACK signal, a NACK signal, a HARQ indicator, and/or various other suitable types of information. The common UL portion 706 may include additional or alternative information, such as information pertaining to random access channel (RACH) procedures, scheduling requests (SRs), and various other suitable types of information. As illustrated in FIG. 7, the end of the DL data portion 704 may be separated in time from the beginning of the common UL portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 8:
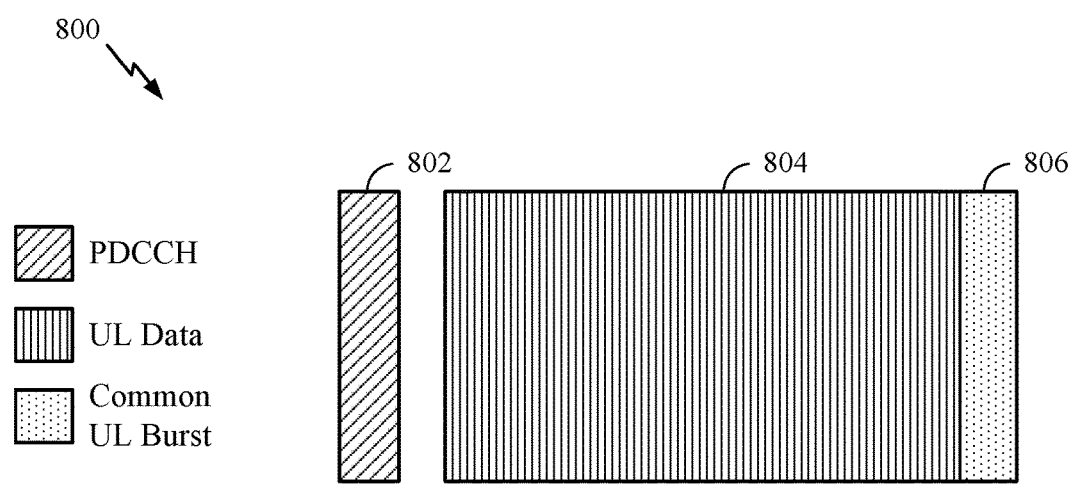
FIG. 8 is a diagram illustrating an example of an uplink (UL)-centric subframe, in accordance with certain aspects of the present disclosure.

FIG. 8 is a diagram 800 showing an example of an UL-centric subframe. The UL-centric subframe may include a control portion 802. The control portion 802 may exist in the initial or beginning portion of the UL-centric subframe. The control portion 802 in FIG. 8 may be similar to the control portion described above with reference to FIG. 7. The UL-centric subframe may also include an UL data portion 804. The UL data portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL data portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 806. The common UL portion 806 in FIG. 8 may be similar to the common UL portion 806 described above with reference to FIG. 8. The common UL portion 806 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

Example Shared Spectrum Deployments

Example deployment scenarios for a shared spectrum, which may include use of an unlicensed radio frequency spectrum, may include operator-based deployments, a stand-alone mode of operation, and/or a dual-connectivity mode of operation. In an operator-based deployment, multiple operators may share a same frequency band. A stand-alone mode of operation may include inter-public land mobile network (PLMN) handover from a licensed carrier. A dual-connectivity mode of operation may include connectivity to a shared spectrum component carrier and to an anchor carrier on licensed spectrum.

Access in Unlicensed Spectrum

Medium access in an unlicensed spectrum may involve a dynamic listen before talk (LBT) procedure. Dynamic LBT procedures may allow sharing of network resources (e.g., frequency resources) on millisecond time scale. However, access to the medium may not be guaranteed, for example, in an asynchronous system. For asynchronous operation, the Node Bs (BSs) may have different frame timings, and transmissions from different Node Bs may not be aligned in time (e.g., one or more subframe and/or frame boundaries of different Node Bs may not be contemporaneously aligned).

A Wi-Fi asynchronous system design may be optimized for dynamic LBT procedures. In a Wi-Fi system, beacon transmissions (overhead signals, reference signals) may be subject to LBT. The periodic beacon signals may be "asynchronous" in nature. Beacon transmissions may not be transmitted frequently and receiving stations (STAs) may trigger asynchronous transmission of beacons in a Wi-Fi system.

STA-based mobility may be needed in an effort to compensate for poor radio resource management (RRM) due to, for example, the asynchronous nature of beacon transmissions. Data transmissions may each contain a preamble which may be used for synchronization and detection of the data burst.

Access in Licensed Spectrum

In 4G/LTE, medium access may be optimized for the licensed spectrum. Accordingly, "sensing" (e.g., monitoring or listening) to determine whether another network node is occupying a same RF band before communicating ("talking") on the RF band, in an effort to avoid interference, may not be required. 4G/LTE systems instead use a periodic transmission of overhead signals. RRM procedures exploit the periodic transmission of these overhead signals. Measurement reporting may be utilized for network-controlled mobility that may take into consideration radio conditions and system loading.

Battery life of UEs may be prolonged using a discontinuous reception (DRX) procedure, whereby a UE discontinuously receives information. During a DRX period, a UE may power down most of its circuitry, thereby saving power.

NR may be optimized for licensed spectrum. While 4G/LTE may not support a fast on/off procedure, where a transmitter-BS may communicate with a wireless device, quickly stop using portions of the spectrum, and quickly reestablish communication, NR system designs may support this feature.

Shared Spectrum Medium Access

A shared spectrum may attempt to minimize changes from the operation of the NR licensed spectrum, in an effort to speed-up shared spectrum deployment. The shared spectrum may accommodate periodic transmissions of overhead and/or common channels. The shared spectrum may not make many changes to RRM and may exploit a fast on/off procedure. According to one example, a BS may communicate with a wireless device using a portion of the shared spectrum and may stop use of the shared spectrum, for example, to defer to a licensed transmitter. The BS may restart using the spectrum when the licensed transmitter stops use of spectrum resources.

Operation in a shared spectrum may include a network listen function at a Node B (BS). Deployments may protect overhead and/or common channels of other deployments. Stated otherwise, a node associated with a first spectrum and first operator may protect overhead and/or common channels transmitted by a node associated with a second spectrum and a second operator.

In a shared spectrum, the configuration used by other wireless devices may be learned by detecting and measuring a neighboring Node B's discovery reference signals (DRS) and/or broadcast channel (BCH). A DRS may include, for example, PSS, SSS, CRS, and/or CSI-RS. The shared spectrum may not use an LBT procedure for overhead signals and/or common channels.

A UE, operating in a shared spectrum, may perform an LBT procedure in an effort to access non-protected resources.

A Spectrum Access System (SAS) may allocate channels within and across tiers. These tiers may include, in order of priority, (1) incumbent licensees; (2) Priority Access licensees (PALs); and (3) General Authorized Access (GAA) operators. A shared spectrum may complement SAS server functionality with over-the-air mechanisms for channel selection.

Example Procedures for Accessing Shared Spectrum in NR

Aspects presented herein provide techniques for accessing shared spectrum, in which multiple operators may operate, based on a type of synchronization operation among nodes associated with the different operators. Specifically, aspects presented herein provide techniques for wireless nodes to access shared spectrum under a fully synchronized operation (or configuration), to access shared spectrum under a partially synchronized operation, and to access shared spectrum under an asynchronous operation. By providing different procedures for accessing shared spectrum (based on a level of synchronization), the techniques presented herein can reduce contention between wireless nodes and improve efficiency of communication in the network (e.g., by reducing the amount of time needed to gain access to the spectrum for communication).

Figure 9:
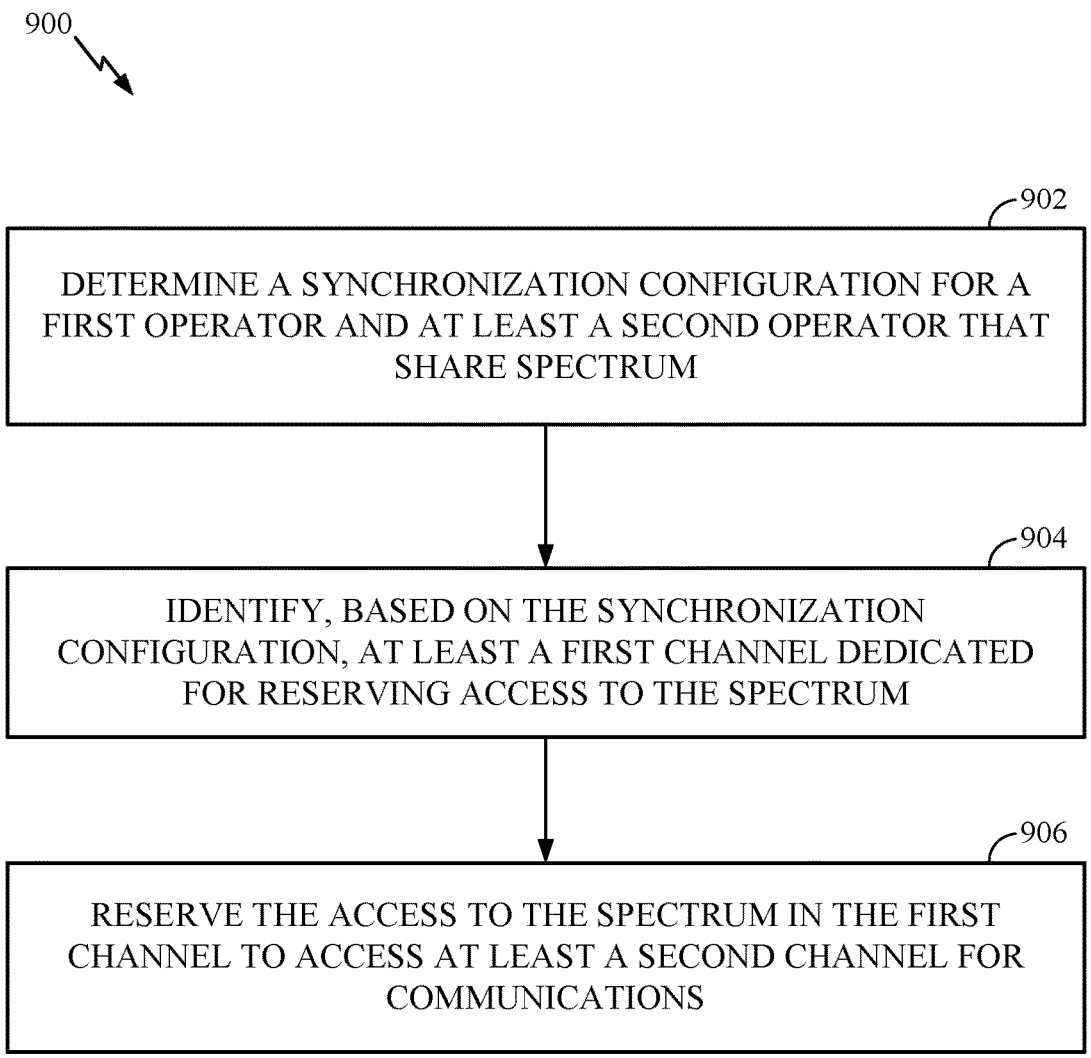
FIG. 9 illustrates example operations, which may be performed by a transmitter, in accordance with aspects of the present disclosure.

FIG. 9 illustrates example operations 900, which may be performed by a transmitter, in accordance with aspects of the present disclosure. The transmitter may operate in a wireless system as illustrated in FIG. 1 and may include one or more components of a BS 110. The BS may be associated with a first operator. In one aspect, the transmitter may include one or more components of a UE 120, acting as a BS 110.

At 902, the BS determines a synchronization configuration for a first operator and at least a second operator that share spectrum (e.g., in NR). At 904, the BS identifies, based on the synchronization configuration, at least a first channel dedicated for reserving access to the spectrum. At 906, the BS reserves the access to the spectrum in the first channel to access at least a second channel for communications.

In one aspect, reserving the access may include exchanging reservation messages (or control signals, access sequences, etc.) with another wireless node associated with the first operator. For example, the BS attempting to reserve a portion of the communication medium (e.g., data channel portion) may transmit a reservation request message (referred to herein as NR_RTS message) to a UE (e.g., UE 120) in order to access (e.g., reserve) the communication medium for transmissions by the BS to the UE (e.g., downlink traffic) or transmissions from the UE to the BS (e.g., uplink traffic).

Once received, the UE may transmit a reservation confirmation message (referred to herein as NR_CTS message) to the BS to confirm reservation of the medium for either downlink or uplink communications. During contention, the first nodes (e.g., BS and UE) to complete the exchange of reservation messages may win the contention for communications on the medium. That is, the first nodes to complete the exchange of reservation messages during the reservation channel can access the reserved portion of the medium. Other wireless nodes (e.g., that did not win contention) may avoid interfering with the wireless nodes that are communicating during the reserved portion of the medium.

According to certain aspects, the BS may determine that the first operator is fully synchronized with at least a second operator. For example, under a fully synchronized operation, all nodes in the communication system may be synchronized. That is, the nodes of an operator may be synchronized with respect to nodes of another operator, and one or more nodes of a given operator may be synchronized with respect to one or more other nodes of the given operator. In a fully synchronized access scenario, techniques presented herein may provide for a synchronized slotted structure for channel access. Within this structure, nodes may access the medium at the slot boundary.

Figure 10:
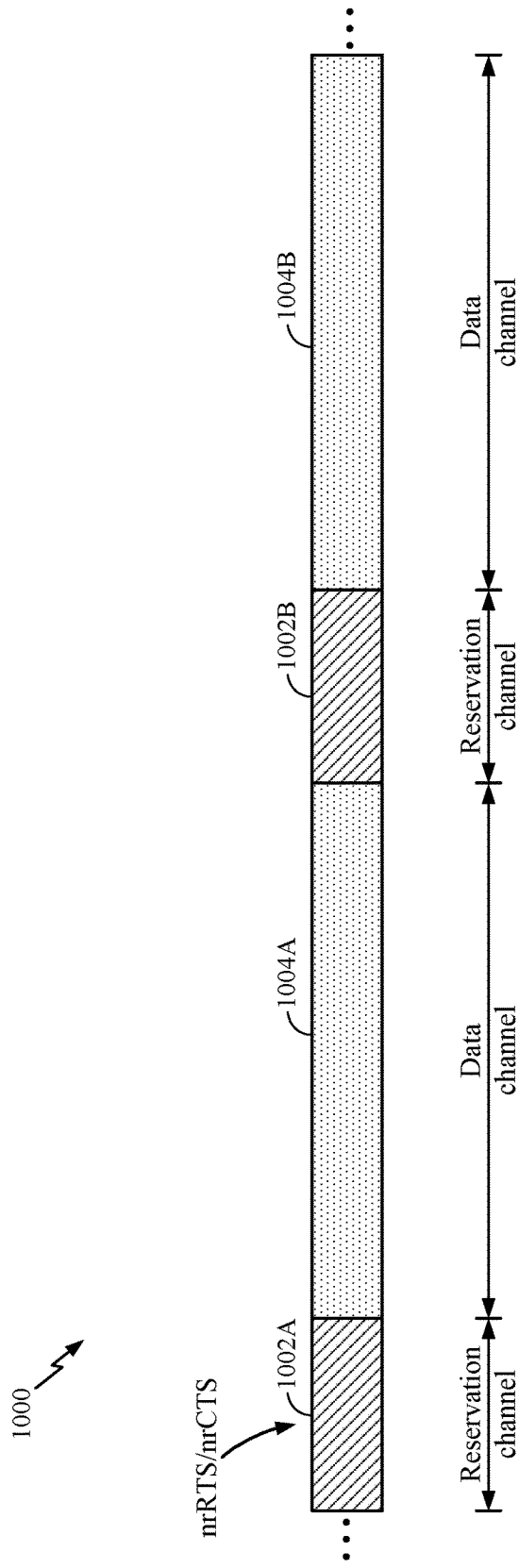
FIGS. 10-13 illustrate example access procedures for fully synchronized operation, in accordance with aspects of the present disclosure.

FIG. 10 illustrates an example medium 1000 with a slotted structure that can be used by nodes, under fully synchronized operation, to access shared spectrum, in accordance with aspects of the present disclosure. As shown in FIG. 10, the slotted structure may include a reservation channel portions 1002A, 1002B, and data channel portions 1004A, 1004B.

In one aspect, BSs may start contention at the boundary of the reservation channels 1002. For example, during the reservation channel portion 1002A (or 1002B), the BS of the first operator may transmit a NR_RTS message to a UE of the first operator in order to reserve the data channel portion 1004A (or 1004B) for uplink or downlink communications with the UE. The BSs may continue contending for access until the end of the reservation channels 1002. In other words, the maximum window size for contention may correspond to the length of the reservation channel 1002.

In one aspect, the first node to complete the NR_RTS/NR_CTS procedure may win the communication medium (e.g., reserve/access the subsequent data channel portion 1004 for communication). Thus, in one example, if reservation during channel 1002A is successful, the BS of the first operator may transmit downlink traffic to the UE of the first operator during data channel portion 1004A or receive uplink traffic from the UE during data channel portion 1004A. On the other hand, if reservation during channel 1002A is not successful, the BS of the first operator may have to wait until the next reservation channel boundary 1002B in order to contend for access to the medium (e.g., to reserve/access data channel portion 1004B for communication). Alternatively, if reservation during a channel 1002 is not successful, the BS of the first operator, in some cases, may reset a counter before restarting contention.

Figure 11:
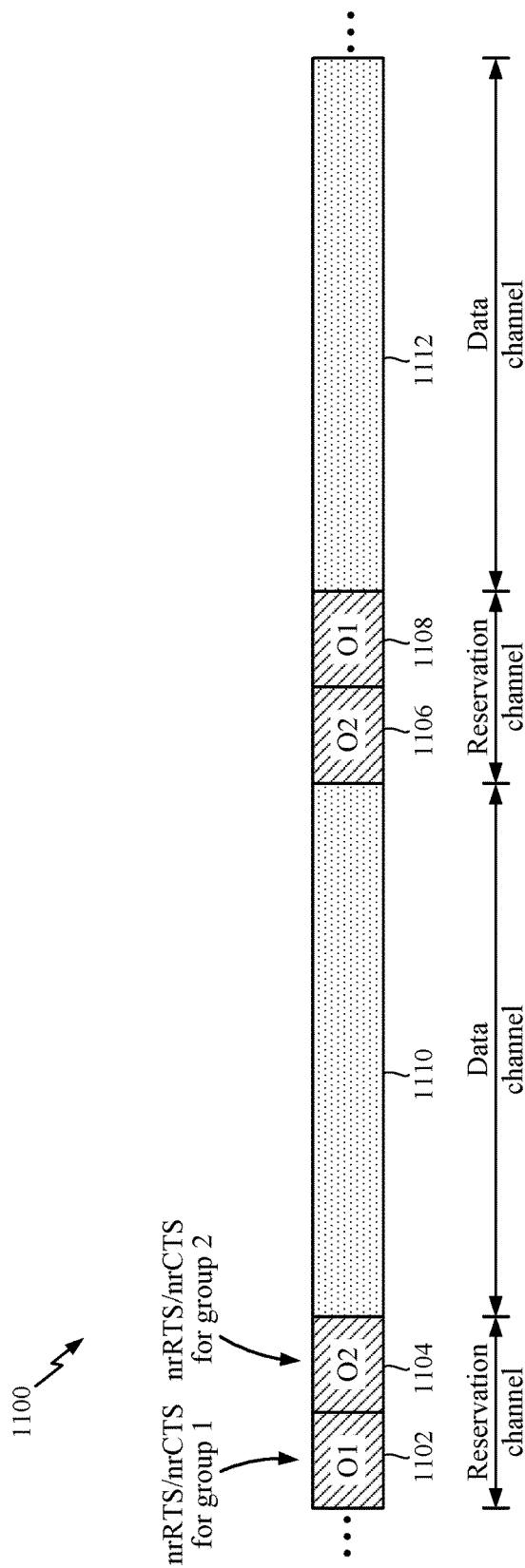
Figure 12:
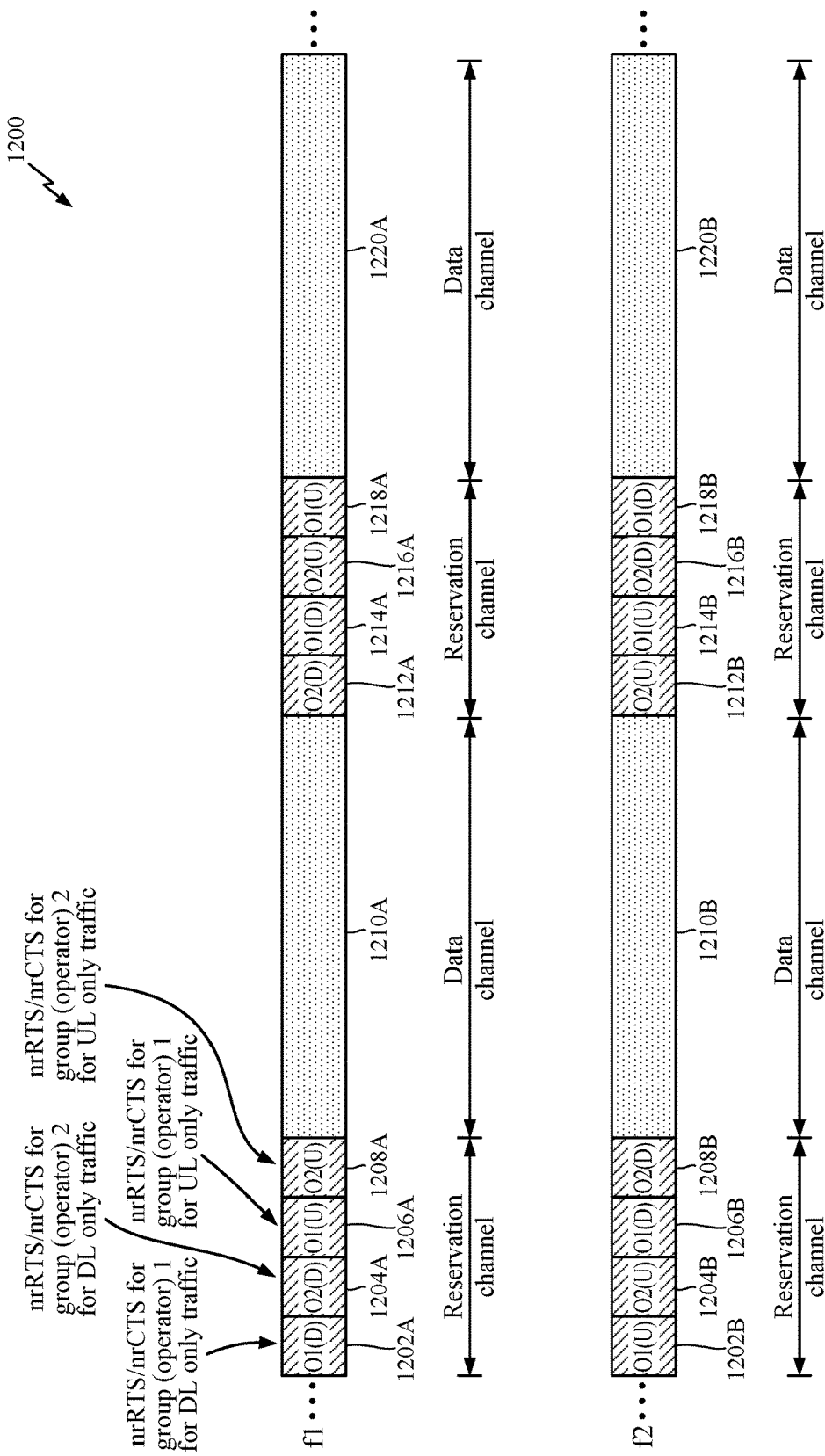
Figure 13:
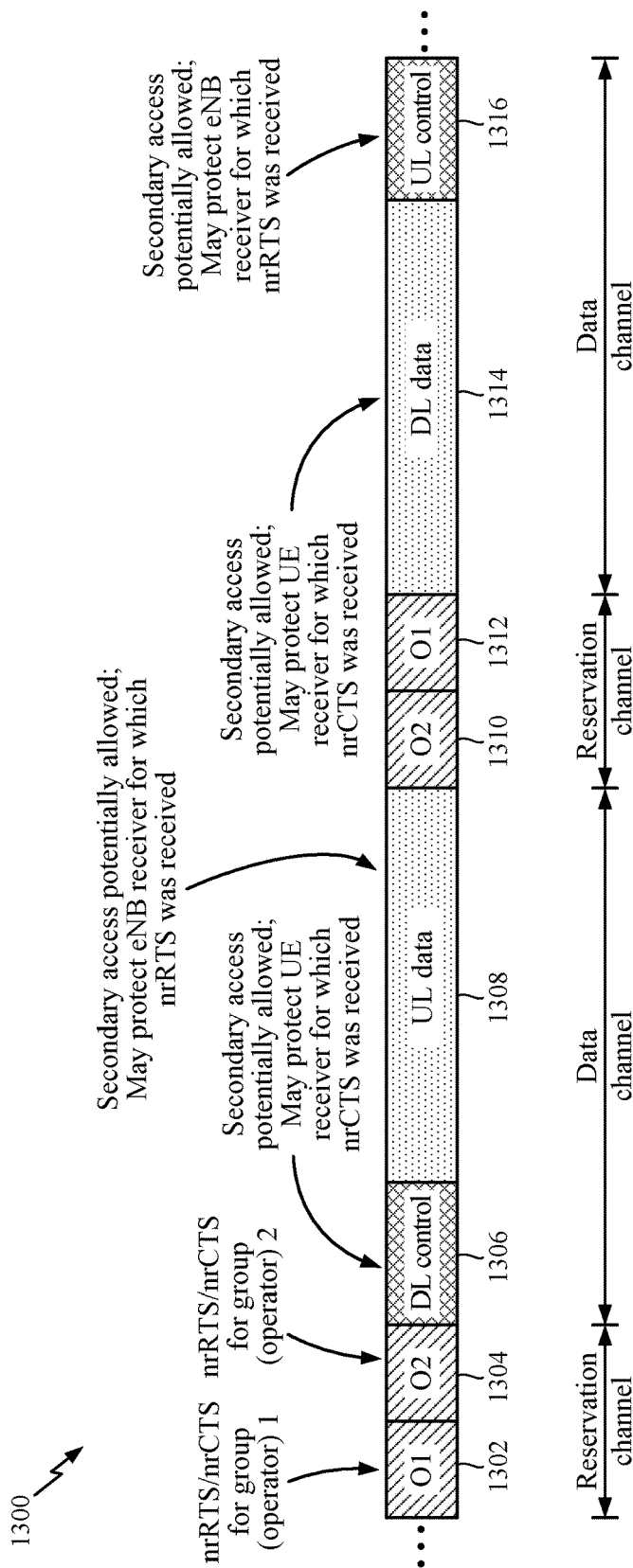

Aspects presented herein also provide one or more optimizations to the slotted access procedure shown in FIG. 10 (e.g., as shown in FIGS. 11-13).

FIG. 11 illustrates an example medium 1100 with a slotted structure that can be used by nodes, under fully synchronized operation, to access shared spectrum, in accordance with aspects of the present disclosure. Compared to FIG. 10, the slotted structure in FIG. 11 may be optimized to further reduce contention between nodes accessing the shared spectrum.

For example, as shown in FIG. 11, the slotted structure includes a first reservation channel that is divided into subchannels 1102 and 1104 and a second reservation channel that is divided into subchannels 1106 and 1108. Each subchannel may be dedicated to a specific group of nodes. For example, in one case, all nodes that are associated with an operator may belong to one group. In another case, one or more nodes associated with one or more operators may belong to one group.

In the example shown in FIG. 11, the nodes associated with a first operator (e.g., O1) may contend for access to the shared spectrum in subchannel 1102 of the first reservation channel and subchannel 1108 of the second reservation channel. Similarly, the nodes associated with a second operator (e.g., O2) may contend for access to the shared spectrum in subchannel 1104 of the first reservation channel and subchannel 1106 of the second reservation channel. The respective subchannels 1102, 1104 of the first reservation channel may be used to reserve the data channel portion 1110 and the respective subchannels 1106, 1108 of the second reservation channel may be used to reserve the data channel portion 1112.

In one aspect, while the nodes associated with O1 contend for access during subchannel 1102, the nodes associated with O2 may monitor for reservation messages exchanged by nodes of O1. If a reservation message (e.g., NR_RTS and/or NR_CTS) is detected, the nodes associated with O2 may wait until the start (or boundary) of the next reservation subchannel 1106 before contending for access. On the other hand, if during reservation subchannel 1102, the nodes associated with O2 do not detect a reservation message, the nodes of O2 may start to contend for access during the boundary of reservation subchannel 1104 (e.g., to reserve data channel 1110). In such a case, the nodes associated with O1 may have to wait until the boundary of reservation subchannel 1108 before re-starting the contention procedure. In some cases, if reuse 1 is desired within a given subchannel reservation group, back off could be set to 0.

In one aspect, the location of the reservation subchannel for each group may be cycled to maintain fairness between groups. For example, as shown, while the nodes associated with O1 may contend first (e.g., before nodes of O2) with reservation subchannel 1102 during the first reservation channel, the nodes associated with O2 may contend first (e.g., before nodes of O1) with reservation subchannel 1106 during the second reservation channel. The selection of the reservation channel (or subchannel) may be centralized (e.g., server based) or distributed (e.g., each node may determine the reservation channel on its own).

FIG. 12 illustrates an example medium 1200 with a slotted structure that can be used by nodes, under fully synchronized operation, to access shared spectrum, in accordance with aspects of the present disclosure. Compared to FIGS. 10 and 11, the slotted structure in FIG. 12 may be optimized to further reduce contention between nodes accessing the shared spectrum.

For example, as shown in FIG. 12, the slotted structure includes a first reservation channel that is divided into subchannels dedicated to a specific group of nodes and dedicated for DL/UL traffic. For example, for a first carrier frequency (f1), nodes of O1 may use reservation subchannels 1202A and 1214A to contend for access to the spectrum to reserve the data channels 1210A and 1220A, respectively, for downlink traffic. Similarly, nodes of O2 may use reservation subchannels 1204A and 1212A to reserve data channels 1210A and 1220A, respectively, for downlink traffic. For uplink traffic, nodes of O1 may use reservation subchannels 1206A and 1218A to reserve data channels 1210A and 1220A, respectively, for uplink traffic, and nodes of O2 may use reservation subchannels 1208A and 1216A to reserve data channels 1210A and 1220A, respectively, for uplink traffic.

In addition, for a second carrier frequency (f2), the nodes associated with O1 and O2 may use their respective subchannels to contend for access to the spectrum to reserve the data channel for either uplink or downlink traffic, e.g., as shown in FIG. 12. For example, reservation subchannels 1202B and 1214B may be reserved for contending for uplink traffic for nodes of O1, reservation subchannels 1204B and 1212B may be reserved for contending for uplink traffic for nodes of O2, reservation subchannels 1206B and 1218B may be reserved for contending for downlink traffic for nodes of O1, and reservation subchannels 1208B and 1216B may be reserved for contending for downlink traffic for nodes of O2. Further, similar to FIG. 11, the location of the particular reservation subchannels may be cycled to ensure fairness to the different groups of nodes and types of traffic (e.g., downlink or uplink).

According to certain aspects, the techniques presented herein may also allow nodes associated with different operators to account for the directionality of traffic during the access procedure to shared spectrum.

FIG. 13 illustrates an example medium 1300 with a slotted structure that can be used by nodes, under fully synchronized operation, to access shared spectrum, in accordance with aspects of the present disclosure. Compared to FIGS. 10-12, the slotted structure in FIG. 13 may be optimized to account for the direction of traffic during the data channel portions.

In the example shown in FIG. 13, during the data channel portions (e.g., DL control portion 1306 and UL data portion 1308), transmitting nodes may just protect the receiver (e.g., BS or UE) that reserved the data channel portion earlier (e.g., during one of the reservation subchannels 1302 or 1304). For example, assume that a BS of O1, during reservation subchannel 1302, successfully reserved the first data channel for communications with a UE associated with O1. In this example, other transmitters (e.g., other nodes associated with O1 and/or O2) may just protect the UE receiver during DL control portion 1306 and the BS receiver during UL data portion 1308. Similarly, during the data channel portions (e.g., DL data portion 1314 and UL control portion 1316), transmitting nodes may just protect the receiver that reserved the data channel portion earlier during one of the reservation subchannels 1310 or 1312. The other transmitters may protect the receiver that reserved the channel earlier by at least one of refraining from transmitting during the reserved portion, or transmitting at a lower power level during the reserved portion. In some cases, depending on the protection, the other transmitters may be allowed to contend for secondary access to the data channel portion, e.g., as shown in FIG. 9.

Note that while FIG. 13 shows a slotted structure with reservation channels dived into subchannels, the techniques for accounting for directionality of traffic can also be used in other examples described herein (e.g., FIGS. 10-12). Further, note that although not shown in FIGS. 10-13, during portions of a reservation channel reserved for DL, UEs may contend for uplink traffic to send control signaling to the BS (e.g., so that the eNB may know what to schedule for the UEs).

According to certain aspects, the BS may determine that the first operator is partially synchronized with at least a second operator. For example, under a partially synchronized operation, there may no synchronization between the nodes of the different operators. Rather, there may be synchronized access between nodes associated with the same operator.

Figure 14:
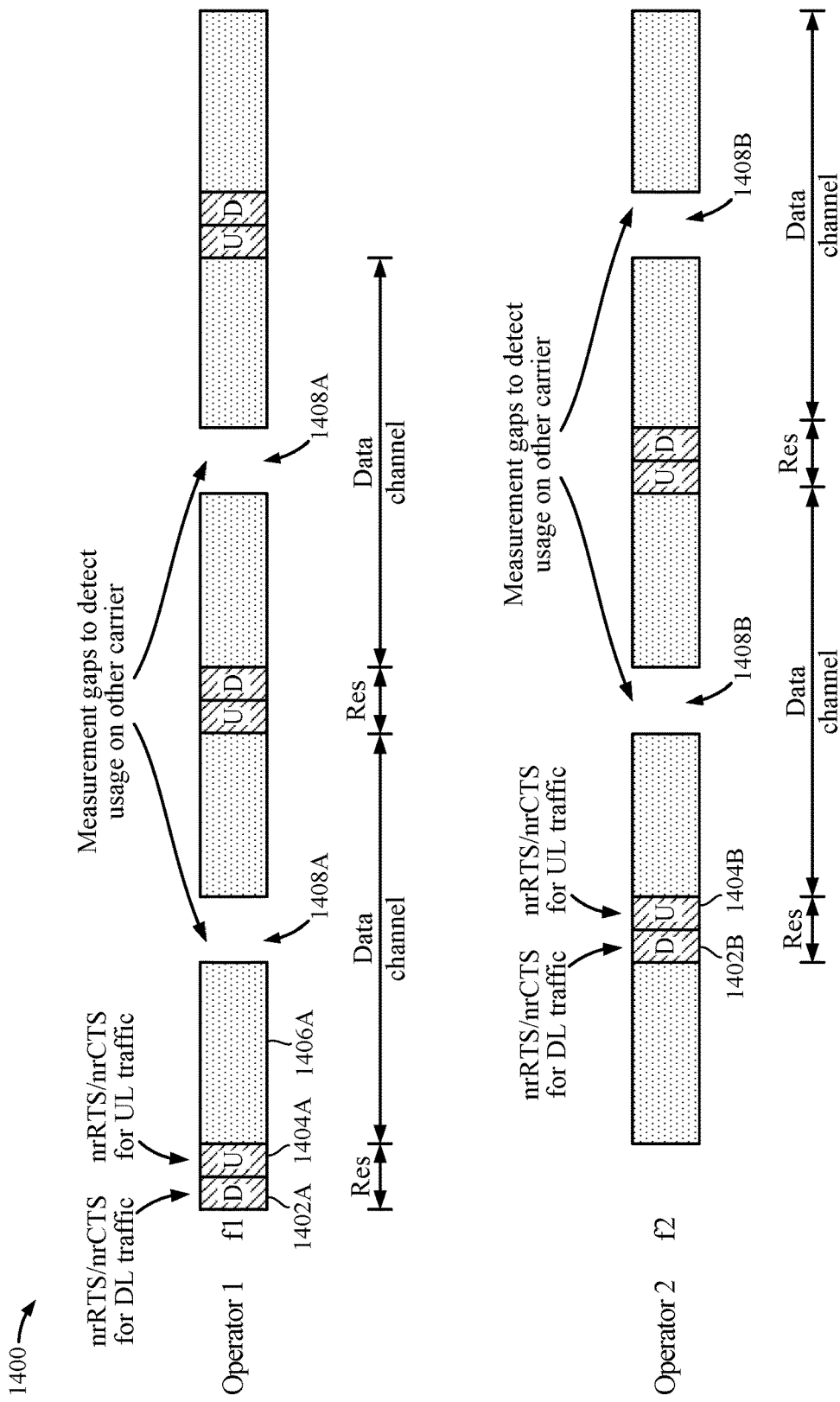
FIGS. 14-15 illustrate example access procedures for partially synchronized operation, in accordance with aspects of the present disclosure.

FIG. 14 illustrates an example 1400 of a synchronized access within a single carrier/operator, in accordance with aspects of the present disclosure. In particular, FIG. 14 illustrates an access procedure that can be used by nodes, under a partially synchronized operation, to access shared spectrum. As shown, the access procedure in FIG. 14 may use a slotted structure similar to those shown in FIGS. 10-13. However, in this example, each operator may be assigned to a different carrier frequency. That is, the slotted structure may apply per selected carrier frequency.

For example, for frequency f1, nodes associated with O1 may use subchannels 1402A (downlink traffic contention) and 1404A (uplink traffic contention) to reserve data channel 1406A for communications. Similarly, for frequency f2, nodes associated with O2 may use subchannels 1402B (downlink traffic contention) and 1404B (uplink traffic contention) to reserve data channel 1406B for communications. The techniques for one operator per carrier frequency may be implemented through channel selection. The selected carrier frequency may be referred to as the primary carrier. In one aspect, if multiple non-synchronous operators select the same carrier frequency, one or more operators may fallback to an asynchronous access procedure.

In certain aspects, the nodes assigned to a given carrier frequency (e.g., associated with one operator) may use measurement gaps 1408 to measure activity on another carrier (e.g., associated with another operator). For example, as shown, while operating on the first carrier frequency, nodes of O1 may monitor reservation subchannels 1402B and 1404B on the second carrier frequency f2 during measurement gaps 1408A for reservation messages (e.g., NR_RTS, NR_CTS, etc.) exchanged by nodes of O2. Similarly, while operating on the second carrier frequency, nodes of O2 may monitor reservation subchannels 1402A and 1404A on the first carrier frequency f2 during measurement gaps 1408B for reservation messages exchanged by nodes of O1. To do so, the nodes of O1 (or O2) may temporarily interrupt communication on the first carrier frequency (or second carrier frequency) during measurement gap 1408A (or 1408B) to tune away to the second carrier frequency (or first carrier frequency) to monitor for reservation messages.

In some aspects, access on the secondary carrier frequency may be allowed after measurements of the activity on the reservation channel. For example, if nodes of O1, during measurement gap 1408A, do not detect exchange of reservation messages, the nodes may determine to use a portion of the medium on the secondary carrier for communication.

Figure 15:
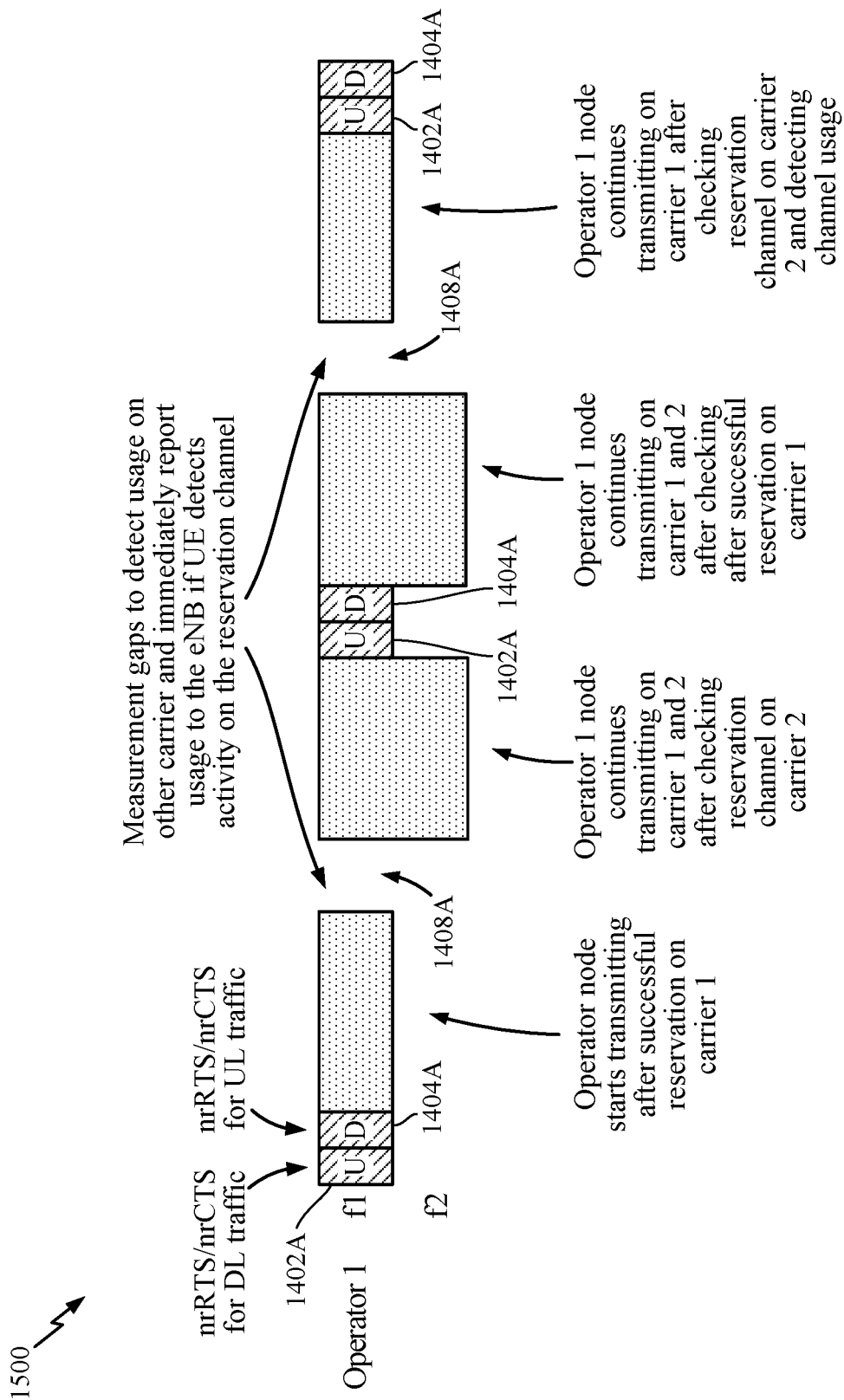

FIG. 15 illustrates one example 1500 of a node associated with a first operator using another carrier assigned to a second operator, in accordance with aspects of the present disclosure. As shown in FIG. 15, the O1 node may start transmitting after successful reservation on carrier f1. The O1 node may continue transmitting on carrier f1 and f2 after checking the reservation channel on carrier f2 (e.g., during measurement gap 1408A). Further, after checking another reservation channel (1402A, 1404A) on carrier 1, the O1 node may continue transmitting on carrier f1 and f2. Finally, in this example, after checking the reservation channel on carrier f2 (e.g., during measurement gap 1408A) and detecting channel usage, the O1 node may continue transmitting just on carrier f1.

In some aspects, the nodes may determine through measurements the timing of the reservation signal(s) of another operator. Based on the measurements, the nodes may configure measurement gaps to detect activity on the reservation channel (of another operator). In some aspects, a fast signature sequence may be defined to indicate detected activity immediately after detection and before continuation of transmission on the primary carrier. Further, note that, in some cases, UEs may use the measurement gaps 1408A to detect usage on other carries. The UEs may immediately report the usage to the BS if the UE detects activity on the reservation channel.

According to certain aspects, the BS may determine that the first operator is in an asynchronous operation (e.g., there is no synchronization within an operator or between operators). In such cases, the access procedure to the shared spectrum may use a procedure similar to IEEE 802.11ax. Aspects presented herein, however, provide one or more enhancements to such a procedure.

For example, in one aspect, nodes contending for access to the spectrum, under an asynchronous configuration, may exchange a first one or more reservation signals with at least another node during a first portion of a reservation channel, and exchange a second one or more reservation signals with a subset of the at least other node during a second portion of the reservation channel.

Figure 16:
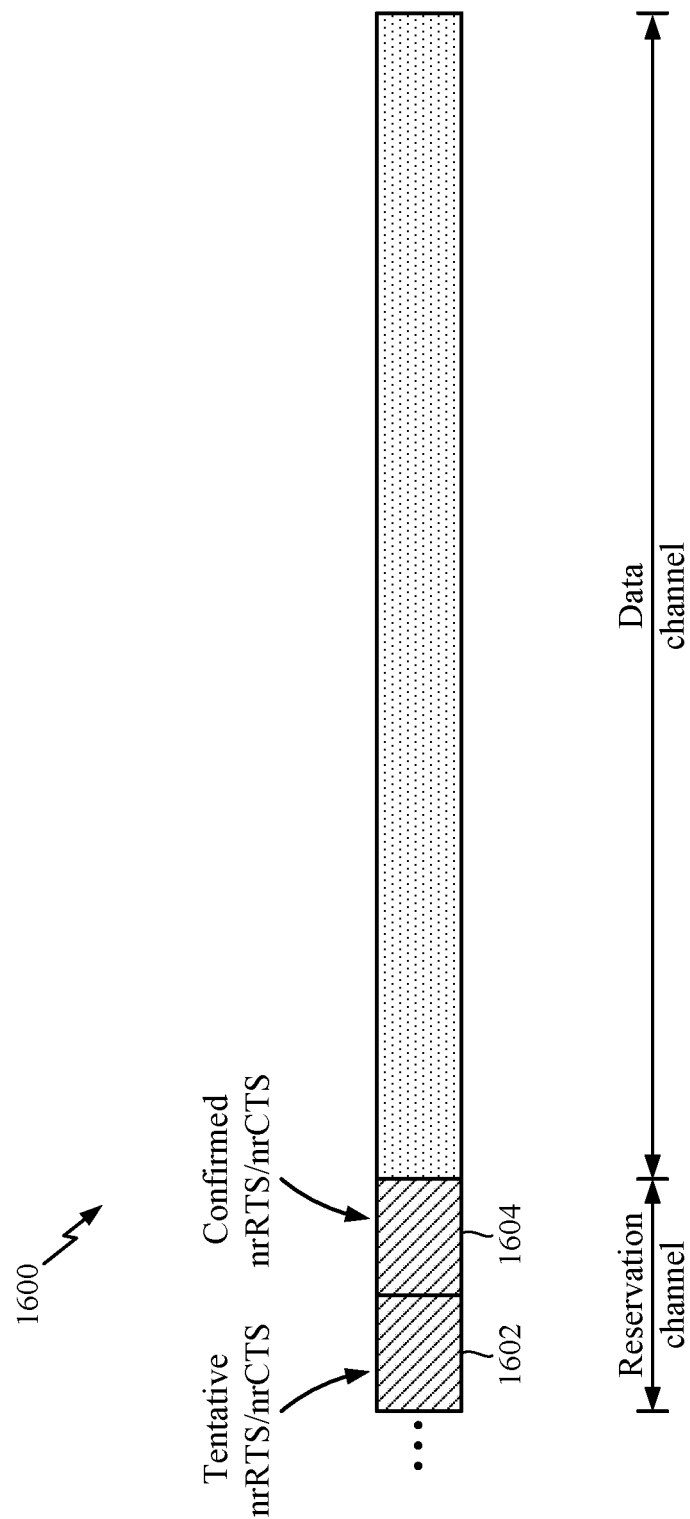
FIG. 16 illustrates an example access procedure for asynchronous operation, in accordance with aspects of the present disclosure.

FIG. 16 illustrates an example access procedure that can be used by nodes, under asynchronous operation, to access shared spectrum, in accordance with certain aspects of the present disclosure.

As shown in FIG. 16, there may be a two phase reservation signal (e.g., NR_RTS/NR_CTS) exchange between nodes. Note, that the reservation exchange can be between nodes of a same operator or nodes of different operators. In one aspect, the first stage 1602 may be used as a tentative reservation stage. For example, during stage 1602, multiple UEs may be scheduled by a BS (e.g., the BS may transmit a NR_RTS to the multiple UEs). The second stage 1604 may be used as a confirmation reservation stage. For example, during stage 1604 a subset of the UEs scheduled in stage 1602 may be confirmed and actually scheduled. In one aspect, the determination of the subset of UEs confirmed in stage 1604 may be based on which UEs in stage 1602 responded to the BS with a reservation confirmation message (e.g., NR_CTS).

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, b-b, b-b-b, b-b-c, c-c, and c-c-c or any other ordering of a, b, and c). Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (e.g., looking up in a table, a database or another data structure), ascertaining, identifying, and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

For example, means for determining, means for performing, means for selecting, means for allocating, means for identifying, means for transmitting, means for receiving, means for sending, means for reserving, means for synchronizing, means for accessing, means for interrupting, means for exchanging, means for protecting, means for adjusting, means for scheduling, means for transmitting, means for monitoring, means for signaling, and/or means for communicating may include one or more processors or other elements, such as the transmit processor 464, the controller/processor 480, the receive processor 458, and/or antenna(s) 452 of the user equipment 120 illustrated in FIG. 4, and/or the transmit processor 420, the controller/processor 440, receiver processor 438 and/or antenna(s) 434 of the base station 110 illustrated in FIG. 4.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product/computer readable medium for performing the operations presented herein. For example, such a computer program product may comprise a computer-readable medium having instructions stored (and/or encoded)

thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by an apparatus of a first operator, comprising:
    determining a synchronization configuration for the first operator and at least a second operator that share spectrum, comprising determining that the first operator is synchronized with the second operator and that the apparatus is synchronized with at least one wireless node associated with the first operator;
    identifying, based on the synchronization configuration, at least a first channel dedicated for reserving access to the spectrum, wherein the first channel comprises a first subchannel dedicated for wireless nodes associated with the first operator to reserve access to the spectrum and a second subchannel dedicated for wireless nodes associated with the second operator to reserve access to the spectrum; and
    reserving the access to the spectrum in the first subchannel of the first channel to access at least a second channel for communications.

2. The method of claim 1, wherein each of the first and second subchannels comprises a portion dedicated for reserving access to the spectrum to access the second channel for downlink traffic and another portion dedicated for reserving access to the spectrum to access the second channel for uplink traffic.

3. A method of wireless communication by an apparatus of a first operator, comprising:
    determining a synchronization configuration for the first operator and at least a second operator that share spectrum, comprising determining that the first operator is synchronized with the second operator and that the apparatus is synchronized with at least one wireless node associated with the first operator;
    identifying, based on the synchronization configuration, at least a first channel dedicated for reserving access to the spectrum;
    reserving the access to the spectrum in the first channel to access at least a second channel for communications;
    monitoring for a reservation message transmitted by a first wireless node of the second operator during the first channel;
    determining, based on detecting the reservation message, that the first wireless node of the second operator has reserved the second channel for communications; and
    protecting communications between the first wireless node of the second operator and a second wireless node of the second operator during the second channel.

4. The method of claim 3, wherein protecting the communications between the first and second wireless nodes of the second operator is based on a direction of the communications between the first and second wireless nodes of the second operator.

5. An apparatus of a first operator for wireless communication, comprising:
    means for determining a synchronization configuration for the first operator and at least a second operator that share spectrum, wherein the means for determining the synchronization configuration determines that the first operator is synchronized with the second operator and that the apparatus is synchronized with at least one wireless node associated with the first operator;
    means for identifying, based on the synchronization configuration, at least a first channel dedicated for reserving access to the spectrum, wherein the first channel comprises a first subchannel dedicated for wireless nodes associated with the first operator to reserve access to the spectrum and a second subchannel dedicated for wireless nodes associated with the second operator to reserve access to the spectrum; and
    means for reserving the access to the spectrum in the first subchannel of the first channel to access at least a second channel for communications.

6. The apparatus of claim 5, wherein each of the first and second subchannels comprises a portion dedicated for reserving access to the spectrum to access the second channel for downlink traffic and another portion dedicated for reserving access to the spectrum to access the second channel for uplink traffic.

7. An apparatus of a first operator for wireless communication, comprising:
    means for determining a synchronization configuration for the first operator and at least a second operator that share spectrum, wherein the means for determining the synchronization configuration determines that the first operator is synchronized with the second operator and that the apparatus is synchronized with at least one wireless node associated with the first operator;
    means for identifying, based on the synchronization configuration, at least a first channel dedicated for reserving access to the spectrum;
    means for reserving the access to the spectrum in the first channel to access at least a second channel for communications;
    means for monitoring for a reservation message transmitted by a first wireless node of the second operator during the first channel;
    means for determining, based on detecting the reservation message, that the first wireless node of the second operator has reserved the second channel for communications; and
    means for protecting communications between the first wireless node of the second operator and a second wireless node of the second operator during the second channel.

8. The apparatus of claim 7, wherein the means for protecting protects the communications between the first and second wireless nodes of the second operator based on a direction of the communications between the first and second wireless nodes of the second operator.

9. An apparatus of a first operator for wireless communication, comprising:
at least one processor configured to:
determine a synchronization configuration for the first operator and at least a second operator that share spectrum by determining that the first operator is synchronized with the second operator and that the apparatus is synchronized with at least one wireless node associated with the first operator;
identify, based on the synchronization configuration, at least a first channel dedicated for reserving access to the spectrum, wherein the first channel comprises a first subchannel dedicated for wireless nodes associated with the first operator to reserve access to the spectrum and a second subchannel dedicated for wireless nodes associated with the second operator to reserve access to the spectrum; and
reserve the access to the spectrum in the first subchannel of the first channel to access at least a second channel for communications; and
a memory coupled to the at least one processor.

10. The apparatus of claim 9, wherein each of the first and second subchannels comprises a portion dedicated for reserving access to the spectrum to access the second channel for downlink traffic and another portion dedicated for reserving access to the spectrum to access the second channel for uplink traffic.

11. An apparatus of a first operator for wireless communication, comprising:
at least one processor configured to:
determine a synchronization configuration for the first operator and at least a second operator that share spectrum by determining that the first operator is synchronized with the second operator and that the apparatus is synchronized with at least one wireless node associated with the first operator;
identify, based on the synchronization configuration, at least a first channel dedicated for reserving access to the spectrum; and
reserve the access to the spectrum in the first channel to access at least a second channel for communications;
a receiver configured to monitor for a reservation message transmitted by a first wireless node of the second operator during the first channel, wherein the at least one processor is further configured to:
determine, based on detecting the reservation message, that the first wireless node of the second operator has reserved the second channel for communications; and
protect communications between the first wireless node of the second operator and a second wireless node of the second operator during the second channel; and
a memory coupled to the at least one processor.

12. The apparatus of claim 11, wherein the at least one processor is configured to protect the communications between the first and second wireless nodes of the second operator based on a direction of the communications between the first and second wireless nodes of the second operator.

13. A non-transitory computer-readable medium having storing instructions that, when executed by a processor, cause the processor to perform an operation for wireless communications, the operation comprising:
determining a synchronization configuration for a first operator and at least a second operator that share spectrum, comprising determining that the first operator is synchronized with the second operator and that an apparatus of the first operator is synchronized with at least one wireless node associated with the first operator;
identifying, based on the synchronization configuration, at least a first channel dedicated for reserving access to the spectrum, wherein the first channel comprises a first subchannel dedicated for wireless nodes associated with the first operator to reserve access to the spectrum and a second subchannel dedicated for wireless nodes associated with the second operator to reserve access to the spectrum; and
reserving the access to the spectrum in the first subchannel of the first channel to access at least a second channel for communications.

14. A non-transitory computer-readable medium having storing instructions that, when executed by a processor, cause the processor to perform an operation for wireless communications, the operation comprising:
determining a synchronization configuration for a first operator and at least a second operator that share spectrum, comprising determining that the first operator is synchronized with the second operator and that an apparatus of the first operator is synchronized with at least one wireless node associated with the first operator;
identifying, based on the synchronization configuration, at least a first channel dedicated for reserving access to the spectrum;
reserving the access to the spectrum in the first channel to access at least a second channel for communications;
monitoring for a reservation message transmitted by a first wireless node of the second operator during the first channel;
determining, based on detecting the reservation message, that the first wireless node of the second operator has reserved the second channel for communications; and
protecting communications between the first wireless node of the second operator and a second wireless node of the second operator during the second channel.

* * * * *